Figure 1:
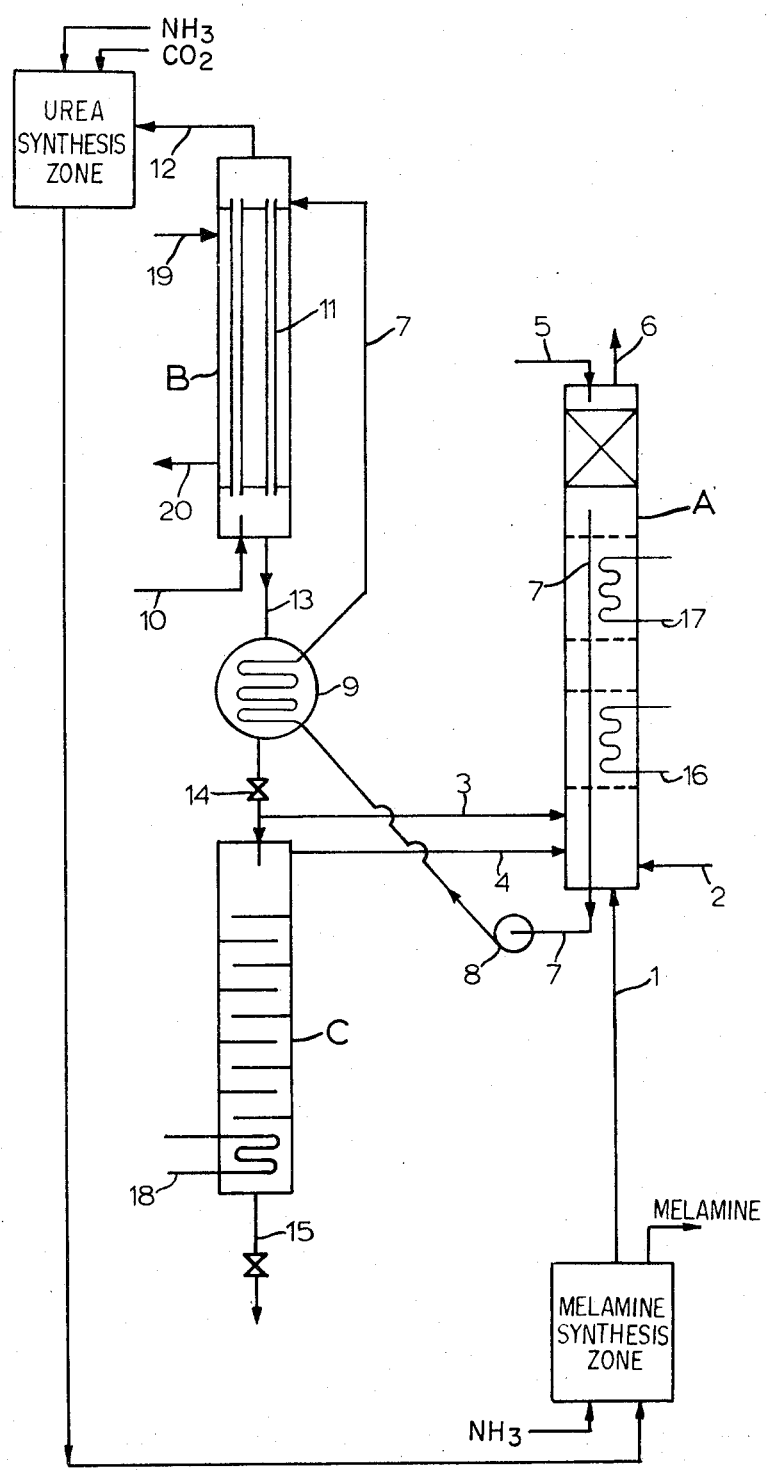

United States Patent
Kaasenbrood et al.

[15] 3,682,911

[45] Aug. 8, 1972

[54] PROCESS FOR PREPARING MELAMINE FROM UREA

[72] Inventors: Petrus J. C. Kaasenbrood, Sittard; Petrus J. M. Van Nassau, Geleen, both of Netherlands

[73] Assignee: Stamicarbon N.V., Heirlen, Netherlands

[22] Filed: Feb. 3, 1969

[21] Appl. No.: 796,093

[30] Foreign Application Priority Data

Feb. 2, 1968 Netherlands..............6801577

[52] U.S. Cl......................260/249.7 A, 260/249.7 P
[51] Int. Cl. .............................................C07d 55/28
[58] Field of Search..260/249.7 A, 249.7 P, 249.7 V, 260/249.7 C

[56] References Cited

UNITED STATES PATENTS

| | | |
|---|---|---|
| 3,290,308 | 12/1966 | Marten....................260/249.7 |
| 3,310,558 | 3/1967 | Oele et al. ..............260/249.7 |
| 3,362,955 | 1/1968 | Weinrotter et al. ....260/249.7 |
| 3,513,167 | 5/1970 | Fromm et al...........260/249.7 |
| 3,492,302 | 1/1970 | Abe et al.................260/249.7 |
| 3,503,970 | 3/1970 | Kanai et al..............260/249.7 |

*Primary Examiner*—John M. Ford
*Attorney*—Cushman, Darby & Cushman

[57] ABSTRACT

An integrated process for the manufacture of melamine in combination with the manufacture of urea is disclosed, wherein the urea product from the urea synthesis unit is used as feed to the melamine synthesis unit. In the process described, the ammonia and carbon dioxide by-products from the melamine plants are processed by condensing the same to form a dilute solution of ammonium carbamate and ammonia and desorbing the resulting solution at urea synthesis pressures, to release a major part of the carbon dioxide, and passing the resulting gaseous mixture containing ammonia and carbon dioxide with only small amounts of water vapor directly to the high pressure urea synthesis unit. Procedures for suitably recovering and using the heat energy released during the various chemical reactions and evaporation steps are also described.

4 Claims, 2 Drawing Figures

PROCESS FOR PREPARING MELAMINE FROM UREA

The invention relates to preparing melamine from urea and, more in particular, a technique for advantageously combining the melamine synthesis process, with the urea synthesis process by returning a solution containing ammonium carbamate (or carbonate) and free ammonia, and which is obtained from the waste gases of the melamine synthesis, to the urea synthesis.

In combining such processes, it is important to their practical utility to be able to utilize successfully the various product and by-product streams, for appropriate recycling of the same, and also to be able to recover the heat energy released from various reactions.

As is commonly known, melamine can be obtained from urea by feeding urea to a catalyst bed of, e.g., silica gel that is kept at a temperature of about 400° C., whereon the urea reacts to form melamine according to the overall reaction equation:

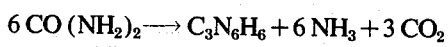

The melamine thus formed is then removed from the catalyst surface by means of a flow of $NH_3$ gas. The gaseous mixture escaping from the melamine reactor thus consists not only of melamine vapor, but also of an ammonia/carbon dioxide mixture with a molar $NH_3/CO_2$ ratio that is considerably higher than 2:1. In certain cases, when the $NH_3$ gas flow also serves as fluidization gas for the catalyst bed, this ratio may even be 10:1 or over.

The melamine is removed from the mixture by cooling and condensing the same, usually in direct contact with water, and the waste gas thus obtained after the melamine has been removed principally consists of $NH_3$, with a little $CO_2$.

The compression of an $NH_3$—$CO_2$ gas mixture to the ordinary levels of pressure and in an urea synthesis presents difficulties, however, in view of the high demands to be made on the compressor in order to prevent corrosion. It is preferred to absorb the gaseous mixture in an aqueous medium and to pass the resulting solution into the urea synthesis plant. In view of the composition of the gaseous mixture, a considerable quantity water is required in order to dissolve the same, and therefore measures have to be taken to avoid introducing all of that water into the urea synthesis process, due to the unfavorable effects of water on the formation of urea.

It has therefore already been proposed first to absorb the waste gas from the melamine synthesis in an absorbent solution in a counter-current absorption column to provide simultaneous discharge of $NH_3$ as the top of the column product, for recycle to the melamine synthesis unit and of an aqueous ammonia/ammonium-carbamate solution from the bottom of the column, containing, e.g., 47 percent by weight of $H_2O$, which, before being fed to the urea synthesis, can be desorbed at a moderate pressure of, e.g., 18 atm, with simultaneous addition of heat. The desorption water is discharged as bottom product from the column used for that purpose, and a gaseous mixture suitable for being vented into the urea synthesis is obtained as top product, containing, in addition to about 25 percent by weight of water vapor, $NO_3$ and $CO_2$ in a molar ratio of, e.g., about 1.7:1.

Before this gaseous mixture is passed into the high-pressure part of the urea synthesis plant, it is first condensed at an ammonium carbamate solution at the prevailing pressure, and this solution is then raised to the urea synthesis pressure.

This known process has, however, the disadvantage that rather large amounts of water are fed to the urea synthesis along with the $NH_3$ and $CO_2$ from the melamine synthesis.

The present invention has as its principal object the avoidance of this disadvantage.

According to the invention the waste gas which contains $NH_3$, $CO_2$ and $H_2O$, and which has been freed from melamine is therefore directly condensed, together with the ammonia water from the melamine plant if desired, to form a dilute solution containing ammonium carbamate and free ammonia. This solution is then raised to urea synthesis pressure and desorbed in a counter-current column to release all or at least a major part of the $CO_2$ required for the urea synthesis, with simultaneous addition of heat. The resulting gaseous mixture which contains $NH_3$, $CO_2$ and only little water vapor, and which is already at the urea synthesis pressure is then passed directly into the high-pressure part of the urea synthesis plant.

The above-mentioned counter-current treatment with $CO_2$ is preferably effected at pressure of 100–150 atm, as in this range a thorough removal of $NH_3$ and $CO_2$ from the solution is obtained, while, furthermore, the urea synthesis is till economically justified at this pressure.

The heat required for desorbing the solution in counter-current relation to the $CO_2$ gas stream will then be gained back to about the same temperature level during the condensation of $NH_3$ and $CO_2$, to form a melt of ammonium carbamate.

Figure 2:
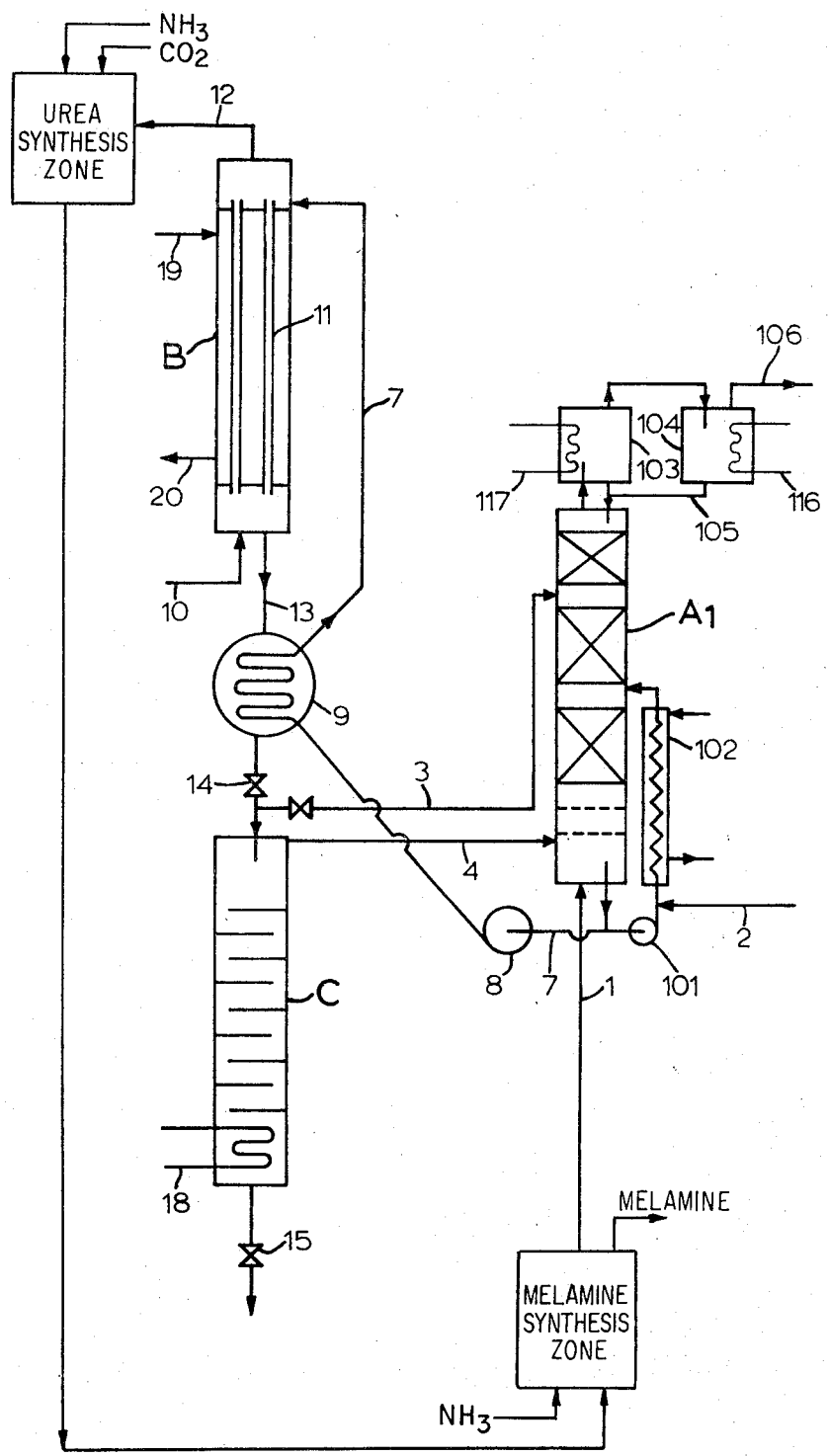

The process according to the invention will be further elucidated with reference to the FIGS. 1 and 2 annexed, which show a diagrammatic embodiment of the process for treating the waste gases of the melamine synthesis.

The embodiment of FIG. 1 relates to a process in which the entire gaseous mixture of $NH_3$ and $CO_2$ from the melamine synthesis is condensed to a solution containing ammonia and ammonium carbamate (or carbonate), whereas in the embodiment of FIG. 2 the process is such that all of the $CO_2$, but only part of the $NH_3$ contained in the gaseous mixture are condensed, while the remainder of the $NH_3$ is discharged as ammonia gas and can be suitably re-used in the melamine synthesis.

The embodiment according to FIG. 2 requires more supervision (to keep column $A_1$ properly operating) that that according to FIG. 1; the advantage is, however, that it permits of a looser coupling between the melamine synthesis and the urea synthesis, so that nonetheless a more flexible operation is possible.

According to the diagram of FIG. 1, the gaseous mixture of $NH_3$, $CO_2$, and water vapor from the melamine synthesis is passed through conduit 1 into the bottom of a column A. In column A a solution of ammonia and carbon dioxide in water is formed, which is passed into the top of stripping column B by way of conduit 7, which is designed as an overflow tube pump 8, and heat exchanger 9.

In column B the solution is desorbed in tubes 11 at urea synthesis pressure in counter-current relation to carbon dioxide supplied through conduit 10. The heat required for this purpose is made available as stream condensing around the tubes — the steam being supplied through conduit 19 and the condensate being removed through conduit 20.

The gaseous mixture freed from the solution, and substantially consisting of $NH_3$ and $CO_2$, flows off through conduit 12 to the high-pressure part of the urea synthesis together with the amount of carbon dioxide used for the desorption, and the desorbed solution, after exchanging heat in heat exchanger 9 with the solution still to be desorbed, and after expanding through pressure-relief valve 14, flows off, part of it being passed through conduit 3 into column A and the remainder into desorption column C, which is preferably a column provided with plates in which the solution is rectified, as shown.

The necessary heat is transferred to the solution via stream spiral 18.

Water, now freed of $NH_3$ and $CO_2$, is discharged through conduit 15, while a gaseous mixture of $NH_3$, $CO_2$, and water vapor is passed into absorption column A through conduit 4.

It is naturally possible to desorb in column C all of the liquid to be discharged through conduit 13, but as a certain amount of water is required in any event in absorption column A, to absorb the gases to be supplied to column A, it is more advantageous from the viewpoint of heat economy not to redesorb all of the solution from column B in column C, but to pass part of it directly into column A as a solution.

In column A gases to be dissolved are fully absorbed in the liquid flows fed in through conduits 2 and 3. The liquid flow fed in through conduit 2 is, for instance, ammonia-containing water that has formed as a condensate in the evaporization and crystallization of melamine and which has to be processed further. The small amounts of inert gas entrained by the $CO_2$ are vented through conduit 6. To wash the final traces of $NH_3$ and $CO_2$ from the gas to be vented, the gas is washed in a section filled with packing bodies in the top of column A in counter-current relation to water supplied through conduit 5.

The heat of absorption released in absorption column A is removed by cooling spirals 16 and 17, the cooling agent used in cooling spiral 16 at the bottom of the column, where most heat is released from the evaporating liquid ammonia, which is subsequently passed to the melamine plant, the cooling agent flowing through cooling spiral 17 being water.

In the embodiment of FIG. 2 an absorption column $A_1$, preferably filled with packing bodies takes the place of column A in the embodiment of FIG. 1. The same process flows as described for FIG. 1 are fed to this column through conduits 1, 2, 3 and 4.

In column $A_1$ an absorbent solution recycles over the packing bodies via pump 101 and cooler 102, so that a proper contact is obtained between the gases to be absorbed and the liquid. Naturally, also, plates may be used instead of packing bodies.

The newly formed amount of solution obtained by dissolving $CO_2$ and $NH_3$ and condensing water vapor, together with the liquid flows supplied through conduit 2 and conduit 3, is continuously discharged to desorption column B through conduit 7.

The gaseous mixture flowing from the top of absorption column $A_1$ and mainly consisting of $NH_3$ with little water vapor and hardly any $CO_2$ is cooled successively in condensers 103 and 104 with cooling water (cooling spiral 117) and evaporating ammonia (cooling spiral 116), after which ammonia gas that has been virtually completely freed of $CO_2$ and $H_2O$ can be returned to the melamine synthesis unit (not shown) through conduit 106.

The condensate formed in the condensers 103 and 104 is refluxed to the absorption column.

Conduit 3 is provided with a valve for controlling the liquid feed to column $A_1$. As, in column $A_1$, less water is required for dissolving the gases to be absorbed than in column A, the liquid feed through conduit 3 in the embodiment according to FIG. 2 can be omitted in may cases.

While this invention may, of course, be practiced in other than the specified embodiments shown herein, the process will now be still further elucidated with reference to the following numerical example, which relates to the embodiment of FIG. 1 for the waste gases of a melamine plant with a capacity of 15,000 metric tons per year, or 1,875 kg per hour.

Per hour, the following material flows fed to column A, which operates at a pressure of 6 atm, are:

| | |
|---|---|
| through conduit 1 (temperature 118 °C) | : 9.0 tons of $NH_3$ |
| | 2.7 tons of $CO_2$ |
| | 4.1 tons of $H_2O$ |
| through conduit 2 (temperature 50 °C) | : 2.9 tons of $NH_3$ |
| | 0.2 ton of $CO_2$ |
| | 5.7 tons of $H_2O$ |
| through conduit 3: | 0.16 ton of $NH_3$ |
| | 0.22 ton of $CO_2$ |
| | 5.0 tons of $H_2O$ |
| through conduit 4: | 0.32 ton of $NH_3$ |
| | 0.44 ton of $CO_2$ |
| | 0.30 ton of $H_2O$, and |
| through conduit 5: | 0.5 ton of $H_2O$. |

The discharge per hour from absorption column A is a solution consisting of:

12.38 tons of $NH_3$ 3.56 tons of $CO_2$ 15.6 tons of $H_2O$ which solution (temperature 60° C.) is raised to a pressure of 125 atm by pump 8 and then returned to stripping column B.

Through conduit 10, 4.75 tons of $CO_2$ i.e., about 30 $m^3$ of $CO_2$ of 125 atm and 180° C., are supplied per hour as a stripping gas.

Per hour, a gaseous mixture consisting of:

11.9 tons of $NH_3$ 7.66 tons of $CO_2$ 0.62 ton of $H_2O$ flows from the top of the column to the urea synthesis reactor, while a solution having a temperature of 180° C. consisting of:

0.48 ton of $NH_3$ 0.65 ton of $CO_2$ 15.0 tons of $H_2O$ is discharged from the bottom of the column.

One-third of this solution is passed to the absorption column, and two-thirds of this solution is desorbed in column C, so that the hourly discharge through conduit 15 is 9.7 tons of water (temp. 160° C.), which, after having released any useful heat in heat exchangers, is drained.

It will thus be seen that this invention may be practiced in various ways and essentially resides in the integration of the flow of materials between the melamine synthesis plant and the urea synthesis plant as described. Generally speaking, the specific temperatures and pressures which may be employed in a patent application of this invention will be apparent to those skilled in the art, and this invention does not reside in the selection of such specific reaction conditions — except in regard to the use of approximate urea synthesis pressures for the desorption step, as is further evident from the following claims.

What is claimed is:

1. In a combination process for the synthesis of melamine having a melamine synthesis zone wherein urea and ammonia are reacted to form a synthesis effluent containing melamine, carbon dioxide and ammonia, and wherein said melamine is removed from said synthesis effluent thereby forming a melamine synthesis waste gas stream virtually free from melamine, containing ammonia and carbon dioxide; and a urea synthesis zone wherein urea to be supplied to said melamine synthesis zone is produced from the reaction of carbon dioxide and ammonia at an elevated temperature and pressure, at least a portion of said carbon dioxide and ammonia being obtained from said melamine synthesis waste gas stream, the improvement consisting essentially in absorbing the ammonia and carbon dioxide contained in said melamine synthesis waste gas stream into an aqueous medium at a pressure no greater than substantially the same pressure as prevailing in said melamine synthesis zone thereby forming a dilute solution of ammonia and ammonium carbamate;

increasing the pressure on said dilute solution thus obtained to approximately the pressure prevailing in said urea synthesis zone; thereafter desorbing ammonia and carbon dioxide from said dilute solution with a countercurrent flow of carbon dioxide with the simultaneous addition of heat to obtain a concentrated gaseous mixture of ammonia and carbon dioxide; and passing said concentrated gaseous mixture directly into said urea synthesis zone whereby the mol.-percent water content of said concentrated gaseous mixture is less than the water content of said dilute solution.

2. The process of claim 1 wherein said dilute solution contains about 30 to 70 mol.-percent ammonia and said concentrated gaseous mixture contains about 50 to 90 mol.-percent ammonia and 40 to 10 mol.-percent carbon dioxide.

3. The process of claim 1 wherein said dilute solution contains about 30 to 60 mol.-percent water, and said concentrated gaseous mixture contains about 10 to 1 mol.-percent water vapor.

4. The process of claim 1 wherein said desorbing step is carried out at a pressure between about 100–150 atm.

* * * * *